United States Patent
Kuei-Ann et al.

(10) Patent No.: US 7,254,380 B2
(45) Date of Patent: Aug. 7, 2007

(54) LOW FLICKER NOISE CURRENT-FOLDED MIXER

(76) Inventors: Wen Kuei-Ann, 1001, TaShueh Rd., HsinChu (TW); Wuen Wen-Shen, 1001, TaShueh Rd., HsinChu (TW)

( * ) Notice: Subject to any disclaimer, the term of this patent is extended or adjusted under 35 U.S.C. 154(b) by 330 days.

(21) Appl. No.: 10/898,510

(22) Filed: Jul. 22, 2004

(65) Prior Publication Data
US 2006/0019628 A1   Jan. 26, 2006

(51) Int. Cl.
*H04B 1/26*   (2006.01)
*H04B 15/00*  (2006.01)
(52) U.S. Cl. ............ 455/313; 455/310; 455/317; 455/319; 455/323
(58) Field of Classification Search ........ 455/283–293, 455/302, 333, 296, 310, 313–326; 327/359, 327/433
See application file for complete search history.

(56) References Cited

U.S. PATENT DOCUMENTS

| | | | |
|---|---|---|---|
| 6,704,559 B1 * | 3/2004 | Hageraats | 455/326 |
| 6,871,057 B2 * | 3/2005 | Ugajin et al. | 455/323 |
| 7,107,035 B2 * | 9/2006 | Otaka | 455/323 |
| 2002/0004376 A1 * | 1/2002 | Lee et al. | 455/326 |
| 2004/0227559 A1 * | 11/2004 | Erba et al. | 327/356 |
| 2004/0259519 A1 * | 12/2004 | Su | 455/326 |
| 2005/0064838 A1 * | 3/2005 | Oh et al. | 455/302 |

* cited by examiner

*Primary Examiner*—Simon Nguyen
(74) *Attorney, Agent, or Firm*—Bacon & Thomas, PLLC

(57) ABSTRACT

The current-folded mixer of this invention comprises an input stage and a switching stage. The input stage receives a radio frequency input RF and generates a modulated bias current to the switching stage. The switching stage has a switching pair, connected to a common node, to receive an input signal and said modulated bias current to generate an output signal in accordance with the input signal and the modulated bias current. The current-folded mixer uses a capacitor to separate the bias current of the input stage and the switching stage and an inductor in the switching stage to supply bias current.

6 Claims, 4 Drawing Sheets

LOW FLICKER NOISE CURRENT-FOLDED MIXER

FIELD OF THE INVENTION

The present invention relates to a low flicker noise current-folded mixer, especially to a current-folded mixer wherein the flicker noise is effectively blocked out.

BACKGROUND OF THE INVENTION

With the rapid expansion of the wireless LAN market, the industry has developed more and more complex modulation technologies in order to increase the data processing rate for components used in the wireless LAN. Among them, the requirements for radio receivers has become more stringent in terms of noise and linearity performance. Since direct conversion has been the most attractive receiver architecture for wideband wireless receivers, the issue of reducing flicker noise is one of the interests of all designers. Moreover, integration of wireless systems also drives the demands for the prior-manufacture co-verification of baseband and radio receivers to ensure the robust performance of the receiver.

The performance of CMOS direct conversion receivers rely very much on the mixer design it uses, since it may induce the DC offset, the even-order distortion and the flicker noise. The flicker noise issue is the greatest design obstacle since CMOS devices are surface channel devices that have worse flicker noises in comparison with that of the bipolar devices. The down converted received signal of a direct conversion receiver is located at the baseband and is easily corrupted by the flicker noise. In addition, as the multi-carrier modulation becomes more popular in wireless communication applications, receivers are facing more strict requirements in their linearity performance and such requirements are obviously more important as both the die size and the power supply are continuously scaling down. Minimizing the flicker noise while achieving sufficient conversion gain and good linearity has thus becomes essential in the design of the CMOS active mixer for direct conversion receivers. The Gilbert-cell architecture is the conventional CMOS active mixer that shows significant design tradeoffs among conversion gain, noise and inter-modulation distortions.

FIG. 1 illustrates the circuit diagram of a conventional single-balanced Gilbert-cell mixer with injection current. As shown in this figure, the mixer circuit 100 is used to combine an RF signal and a differential input signal. The mixer circuit 100 includes a switching stage 110 and an input stage 120. The switching stage 110 receives a differential input signal LO+, LO− and produces a differential output signal IF+, IF−. The switching stage 110 has a pair of NMOS transistors M2 and M3, which sources are coupled to a common node X. The switching stage 110 further includes a pair of load resistors RL1, RL2, which connect the drains of the transistors M2, M3 and a supply voltage VDD, respectively. The input stage 120 has an NMOS transistor M1 that receives an input of radio frequency signal RF. An injection current $I_{inj}$ provides bias to the input stage 120. The input stage 120 uses the RF input to produce an RF voltage. The RF voltage is coupled to the common node X. A modulated output is generated by the mixer circuit 100 by including the RF signal to the input stage 120 to modulate the bias currents in transistors M2 and M3, such that the gain of the switching stage 110 varies in proportion to the amplitude of the LO signal.

The flicker noise of a single-balanced Gilbert-cell mixer comes from both the input stage and the switching stage. It is believed that the switching stage 110 dominates the flicker noise contribution at the mixer output. To minimize the flicker noise generated from the switching stage, the dimension of the switching pair M2, M3 can be made larger but this increases the noise contribution of the in-direct mechanism of the flicker noise through the parasitic capacitance at the common node X of the sources coupled switching pair M2, M3.

In order to solve this problem, a proposal to reduce the flicker noise may be seen in Manstretta et al., "Low 1/f Noise CMOS Active Mixer for Direct Conversion", IEEE Trans. Circuits and Systems-II: Analog and Digital Signal Processing, vol. 48, No. 9, pp. 846-850, September 2001, wherein the tail current of the switching stage and the current of the input stage are separated to decouple the tradeoff.

In addition, a solution was proposed to add a capacitor connecting the gate of the injection current Iinj and the RF input, in order to reuse the injection current as part of the input stage. The reuse of injection current improves the gain of the input stage and thus reduces the noise contributed by the switching stage. However, under such a design, the common node X is tied to the drains of the input stage, which leaks the input stage flicker noise to the output due to the mismatch of the switching pair M2, M3. Such leakage is not negligible, since in such an architecture flicker noise in the input stage 120 is even important with that of the switching stage 110.

In Phan et al., "A High Performance COMS Direct Down Conversion Mixer for UWB System", GLSVLSI'04, Apr. 26-28, 2004, a double-balanced Gilbert-type mixer is proposed. In the proposal, an inductor is provided at between the input stage and the common node to decouple the flicker noise. However, such solution does not decouple the flicker noise from the input stage of the mixer.

It is thus necessary to provide a novel current-folded mixer wherein the flicker noise may be effectively reduced.

It is also necessary to provide a current-folded mixer with low flicker noise while higher conversion gain and linearity may be maintained.

It is also necessary to provide a simplified current-folded mixer with relative low flicker noise.

OBJECTIVES OF THE INVENTION

The objective of this invention is to provide a novel current-folded mixer wherein the flicker noise may be effectively reduced.

Another objective of this invention is to provide a current-folded mixer with low flicker noise while higher conversion gain and linearity may be maintained.

Another objective of this invention is to provide a simplified current-folded mixer with relative low flicker noise.

SUMMARY OF THE INVENTION

According to this invention, a low flicker noise current-folded mixer is provided. The current-folded mixer of this invention comprises an input stage and a switching stage. The input stage receives an RF input and generates a modulated bias current to said switching stage. The switching stage has a switching pair, connected to a common node, to receive an input signal and said modulated bias current to generate an output signal in accordance with said input signal and said modulated bias current. The current-folded mixer uses a capacitor to separate the bias current of the input stage and the switching stage and an inductor in said switching stage to provide bias current. The mixer effectively decouples the flicker noise and the linearity design tradeoffs and exhibits higher conversion gain, higher linearity and low noise rate than that of the conventional current-reused injection topology.

These and other objectives and advantages of this invention may be clearly understood from the detailed description by referring to the attached drawings.

DETAILED DESCRIPTION OF THE INVENTION

Figure 1:
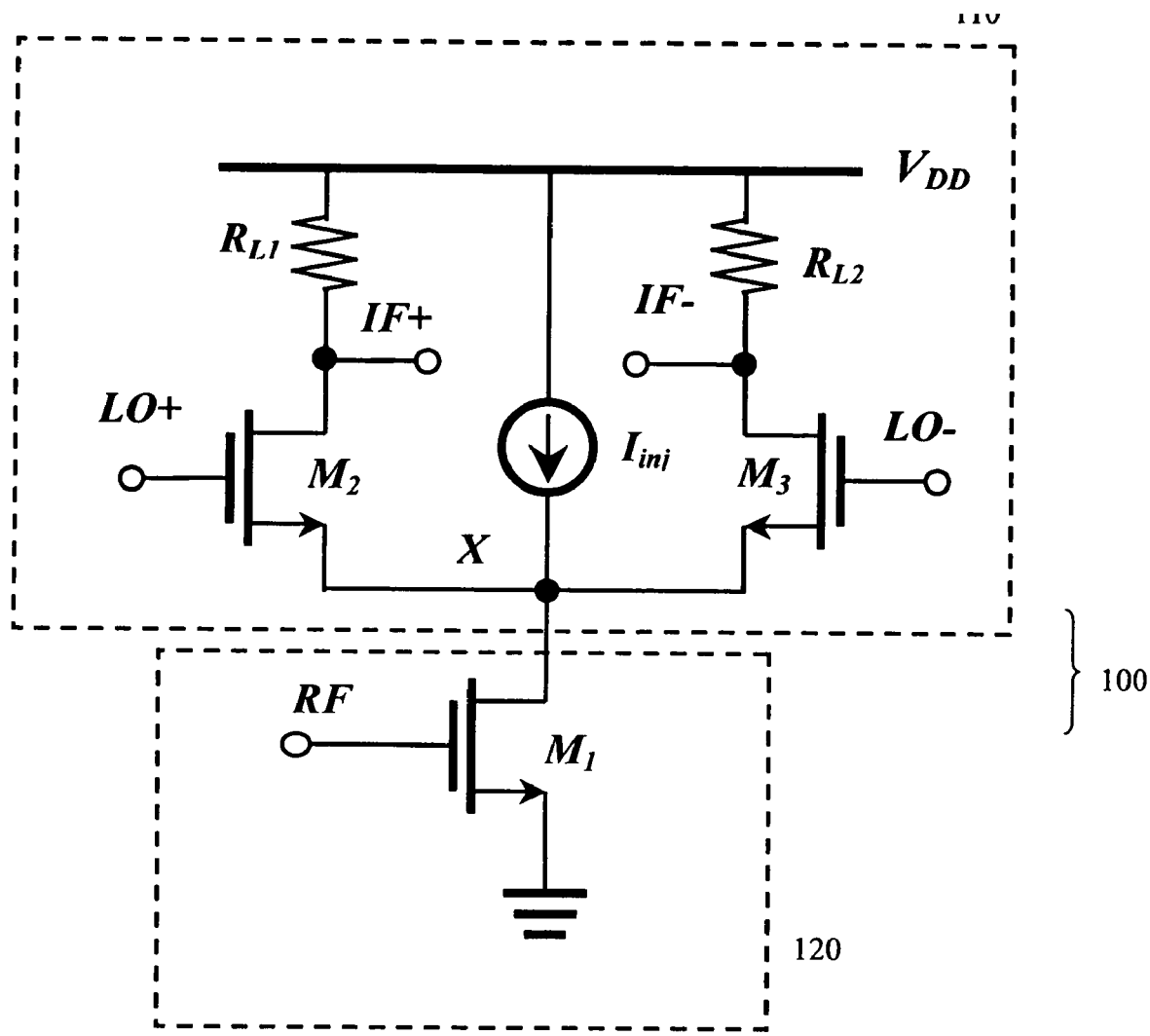
FIG. 1 illustrates the circuit diagram of a conventional single-balanced Gilbert-cell mixer with injection current.
Figure 2:
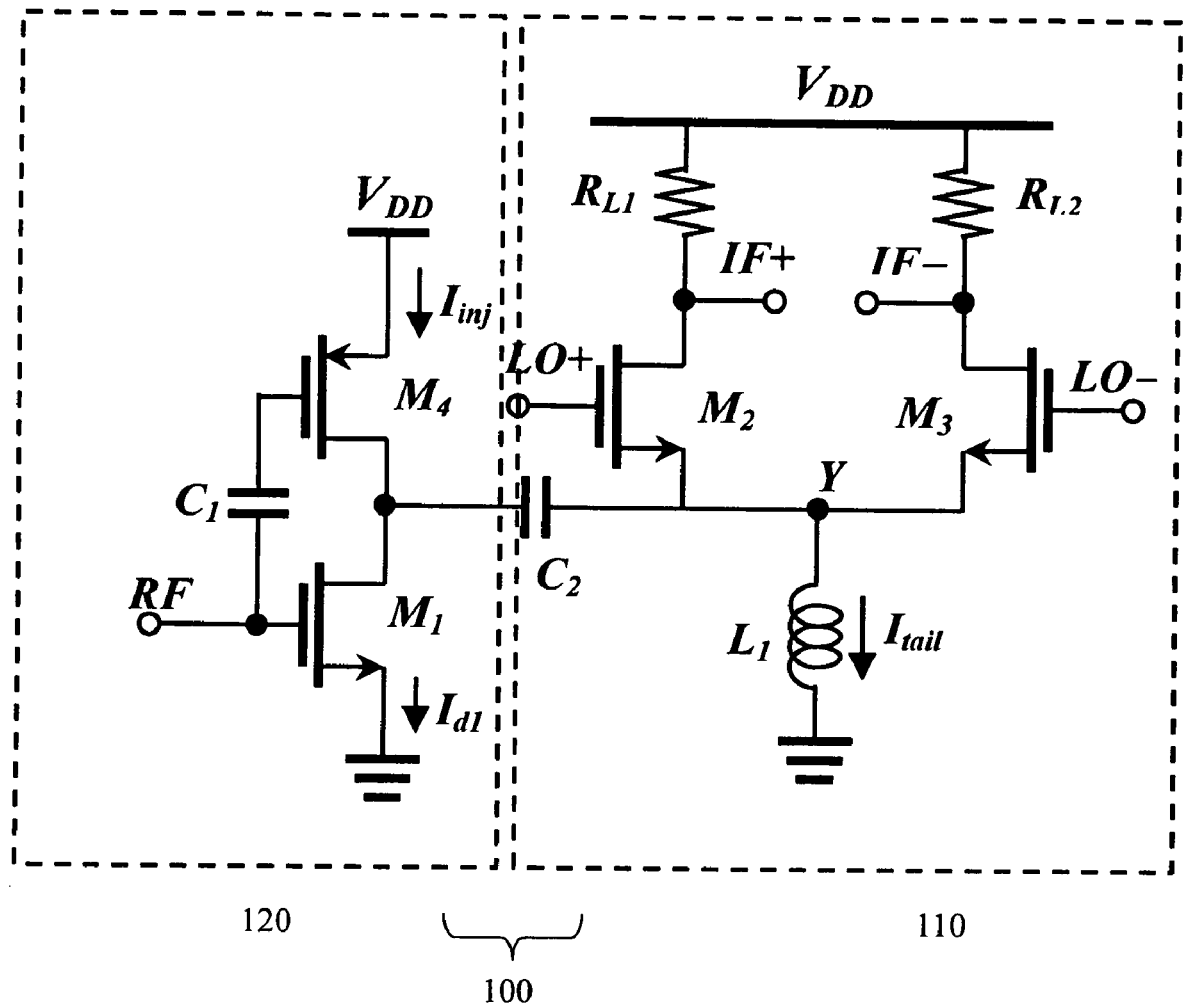
FIG. 2 illustrates the circuit diagram of the low flicker noise current folded mixer of this invention.

FIG. 2 illustrates the circuit diagram of the low flicker noise current-folded mixer of this invention. As shown in this figure, the current-folded mixer 100 of this invention comprises an input stage 120 and a switching stage 110. The input stage 120 receives a radio frequency input RF and generates a modulated bias current to the switching stage. The switching stage 110 has a switching pair M2, M3, connected to the common node Y, to receive an input signal LO+, LO− and the modulated bias current to generate an output signal IF+, IF− in accordance with the input signal and the modulated bias current. The current-folded mixer 100 has a capacitor C2 to separate the bias current of the input stage 120 and the switching stage 110 and an inductor L1 in the switching stage 120 connecting to ground, to work as current source for the desired signal and as short circuit for the unwanted flicker noise.

In the embodiment shown in FIG. 2, the input stage 120 comprises an NMOS M1 and a PMOS M4 for voltage-current conversion. The input stage 120 is AC coupled to the switching stage 110 by a metal-insulator-metal (MIM) capacitor C2 to separate the voltage-current conversion circuit 120 and the switching stage 110. A spiral inductor L1 is connected to ground to supply bias current. The inductor works as short circuit for the unwanted flicker noise. The spiral inductor L1 decouples the flicker noises through an indirect mechanism and tunes out the parasitic capacitance of the switching pair M2, M3.

The coupling capacitor C2 does not only separate the bias current $I_{tail}$ of the switching stage 110, the input stage current $I_{dl}$ and the injected current $I_{inj}$ to decouple the design tradeoff, but also blocks the flicker noise of the input stage 120 from leaking into the output nodes due to mismatch of the switching pair M2 and M3. The input flicker noise may also leak to the output of the Gilbert-cell current-injection mixer because of the finite slope of the LO waveform at zero crossing that causes a finite duration in which both transistors M2, M3 of the switching pair operate simultaneously. Although increasing the slope of the LO waveform may reduce the leakage, a larger LO power may be needed, whereby more power is consumed. The capacitor used in the present invention provides better performance in blocking out the flicker noise of the input stage.

Because of the AC coupling, the flicker noise at the output of the mixer comes mainly from the switching stage. It is possible to reduce such flicker noise by modifying the operation region of the switching pair M2, M3. In addition, if the switching stage and the input stage are not stacked as in the conventional Gilbert-cell topology, the mixer may operate at low voltage. As these modifications are known to those skilled in the art, detailed description thereof is omitted.

Figure 3:
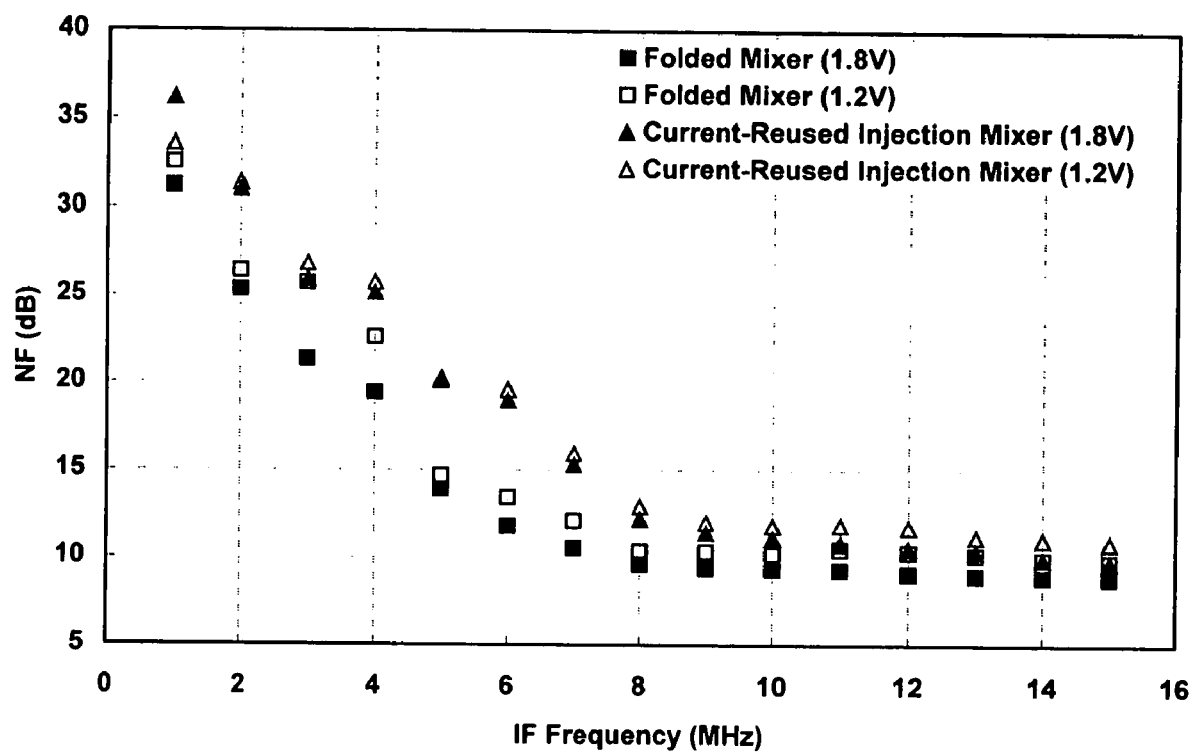
FIG. 3 shows the measured noise figures of the current-folded mixer of this invention in comparison with a conventional current reuse mixer.
Figure 4:
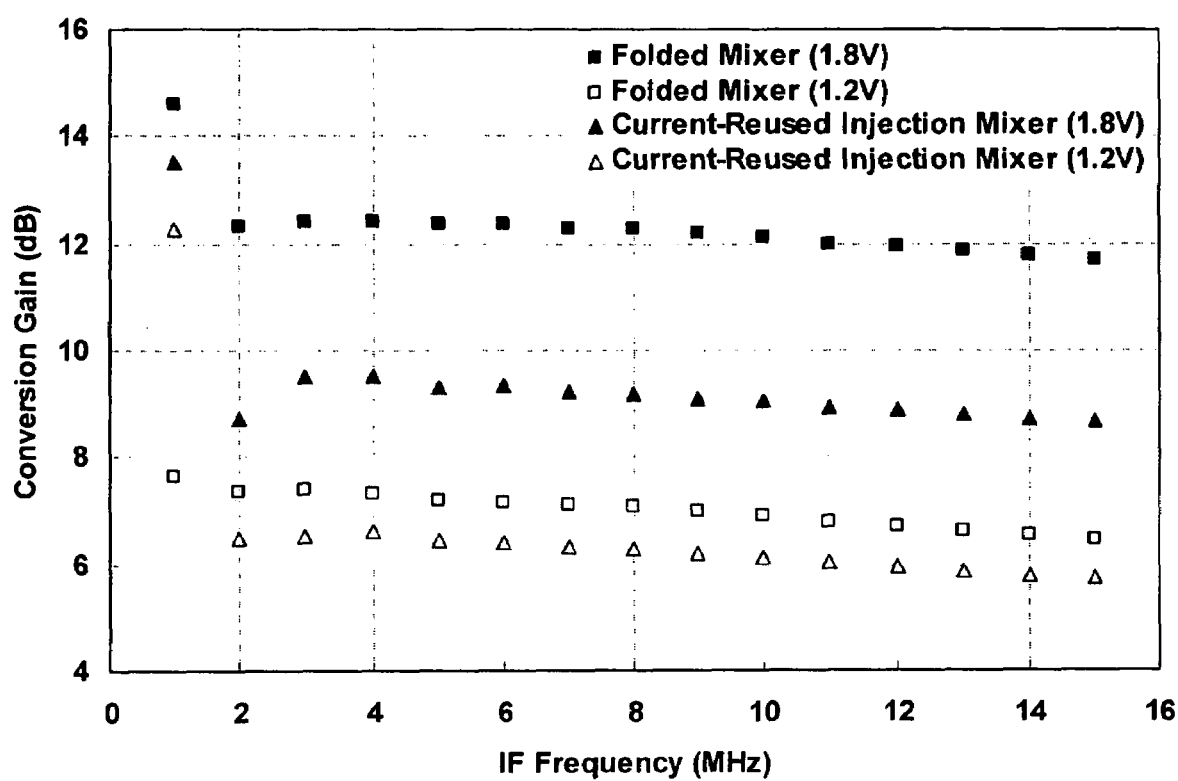
FIG. 4 shows the measured power conversion gain of both mixers while the RF frequency sweep with the LO is fixed at 2.45 GHz.

A mixer with the structure of FIG. 2 and a conventional current-reused injection mixer are fabricated and their noise figure are measured with a power spectrum analyzer (PSA, Agilent E4440A) and an ENR (Excess Noise Ratio) source NC3201. The noise figures are measured at LO frequency of 2.45 GHz as the RF frequency sweeps and hence the IF frequency sweeps. FIG. 3 shows the measured noise figures of the current-folded mixer of this invention in comparison with a conventional current reuse mixer. The figure shows that the noise figure of the present invention is lower than that of the conventional mixer, especially at very low IF frequencies. Even at low-voltage mode where Vdd=1.2V, the noise figure of this invention is still lower than the conventional art. FIG. 4 shows the measured power conversion gain of both mixers while the RF frequency sweep with the LO is fixed at 2.45 GHz. As shown in this figure, the conversion gain of the present invention is greater than that of the conventional mixer, which complies with the simulation results. Further experiments show that the noise figure and the conversion gain of the present invention vary with the LO power level. As the LO power increases, the noise figure decreases and the conversion gain increases. The conversion gain and the noise figure saturate when the LO power level is 0 dBm.

The above experiments show that the current-folded mixer of this invention effectively decouples the flicker noise and the linearity design tradeoffs and exhibits higher conversion gain, higher linearity and low noise rate than that of the conventional current-reused injection topology.

As the present invention has been shown and described with reference to preferred embodiments thereof, those skilled in the art will recognize that the above and other changes may be made therein without departing from the spirit and scope of the invention.

What is claimed is:

1. A current-folded mixer comprising an input stage and a switching stage;
   wherein said input stage receives a radio frequency input, generates a modulated bias current, and supplies said modulated bias current to said switching stage, and said switching stage comprises a switching pair, connected to a common node, to receive an input signal and said modulated bias current to generate an output signal in accordance with said input signal and said modulated bias current;
   wherein said input stage is coupled to said switching stage by a capacitor arranged to separate said input stage and said switching stage and to thereby block flicker noise of the input stage from leaking into the switching stage; and
   wherein said switching stage comprises an inductor connected to supply bias current to said switching pair and to operate as a short circuit for flicker noise in said switching stage.

2. The current-folded mixer according to claim 1, wherein said input stage comprises an NMOS and a PMOS for voltage-current conversion.

3. The current-folded mixer according to claim 1, wherein said input stage is AC coupled to said switching stage by said capacitor.

4. The current-folded mixer according to claim 1, wherein said input stage is coupled to said switching stage by a metal-insulator-metal (MIM) capacitor.

5. The current-folded mixer according to claim 1, wherein said inductor is a spiral inductor.

6. The current-folded mixer according to claim 5, wherein said spiral inductor is connected between said common node and ground.

\* \* \* \* \*